June 24, 1930.   R. T. VAN VALKENBURGH ET AL   1,767,329
POWER TRANSMISSION MECHANISM
Filed March 9, 1929   3 Sheets-Sheet 1

INVENTORS
R. T. Van Valkenburgh
and C. J. Van Valkenburgh
Lloyd W. Patch
ATTORNEY.

June 24, 1930.  R. T. VAN VALKENBURGH ET AL  1,767,329
POWER TRANSMISSION MECHANISM
Filed March 9, 1929   3 Sheets-Sheet 2
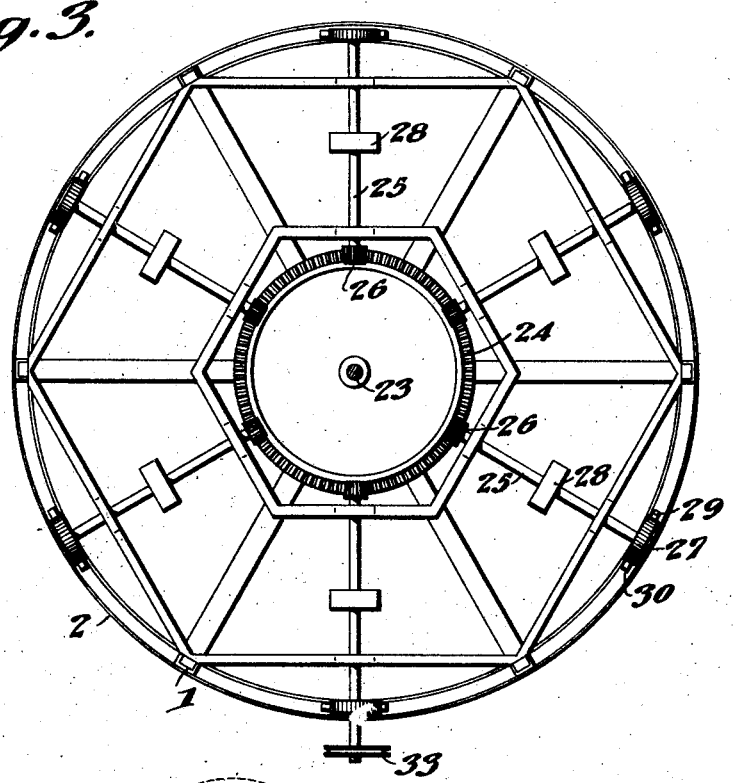
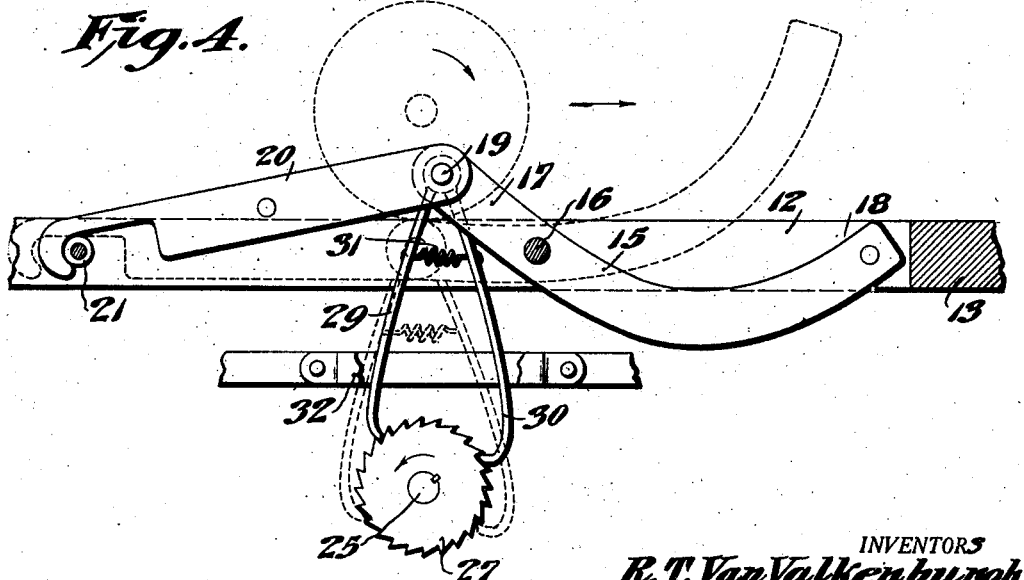
INVENTORS
R. T. Van Valkenburgh
and C. J. Van Valkenburgh
Lloyd W. Patch
ATTORNEY.

June 24, 1930.  R. T. VAN VALKENBURGH ET AL  1,767,329
POWER TRANSMISSION MECHANISM
Filed March 9, 1929    3 Sheets-Sheet 3
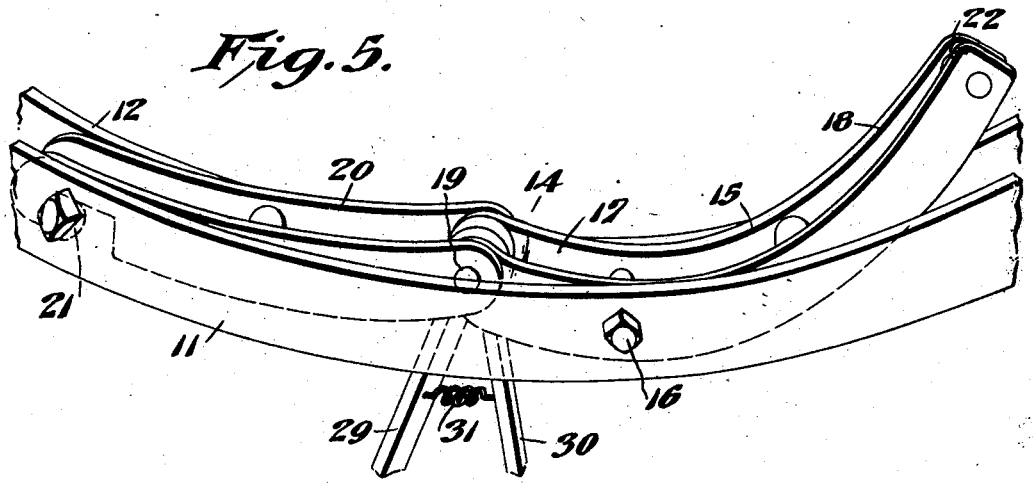
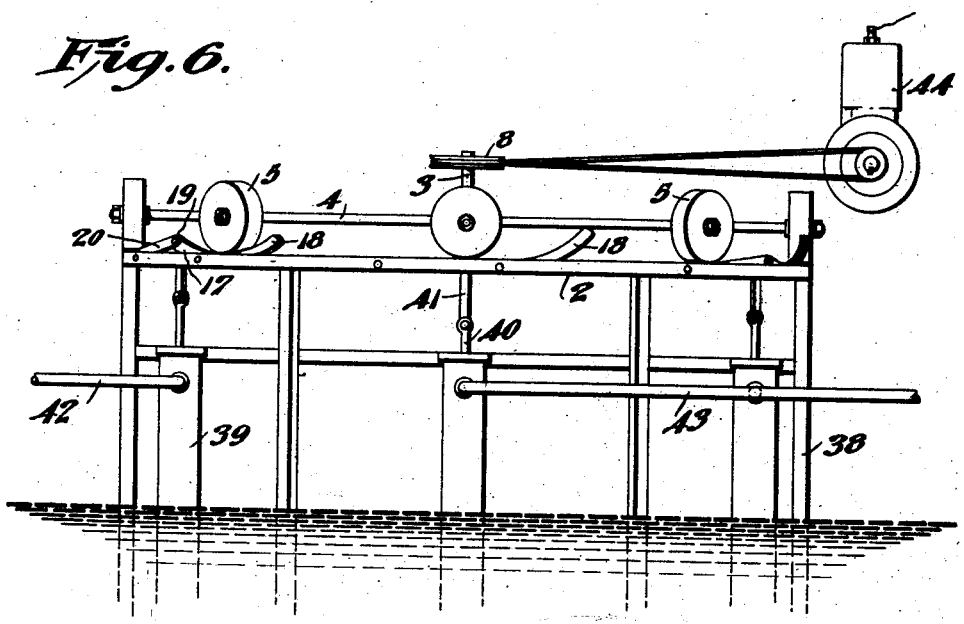
INVENTORS
R. T. Van Valkenburgh
and C. J. Van Valkenburgh
ATTORNEY.

Patented June 24, 1930

1,767,329

UNITED STATES PATENT OFFICE

RANDALL T. VAN VALKENBURGH AND CECIL J. VAN VALKENBURGH, OF ANN ARBOR AND DETROIT, MICHIGAN

POWER TRANSMISSION MECHANISM

Application filed March 9, 1929. Serial No. 345,700.

Our invention relates to power transmission mechanism, and particularly to a mechanism intended and adapted to use a rotary power impulse to accomplish reciprocatory power motion or rotary power motion at a different speed.

An object of this invention is to provide a mechanism by which weighted wheels are caused to travel over a plurality of levers, one of which is rocked to give the power transmitting impulses, the remaining lever portions being arranged to increase the actuating leverage.

Another object is to so construct the parts that the weighted wheels will travel in a substantially circular path to recurrently pass over the arrangement of levers, the force of motion carrying the wheel over the lever arrangement to give power transmitting impulses and increase the actuating leverage force on both the upward and downward swing of the power transmitting lever.

Another object is to provide a mechanism with which any form of initial power means can be used and the power transmission can be used as either a reciprocating or rotating force.

Yet another object is to so construct the mechanism that a plurality of lever arrangements are provided to be successively actuated by the rolling weight traveling in a substantially circular path, and the power impulse on the several lever arrangements can be collected to give the power output.

A still further object is to provide a mechanism with which the speed of movement at the power output can be increased or decreased in any desired ratio.

Still another object is to provide a mechanism of the type set forth above which is of simple and inexpensive construction and which will operate efficiently and without excessive wear upon the working parts, thus giving a mechanism which will afford continuous service without the likelihood of breaking of the parts or shutting down for other repairs or replacements.

With the above and other objects in view, which will be apparent to those skilled in the art our invention includes certain novel features of construction and combinations of parts which will be hereinafter set forth in connection with the drawings and then pointed out in the claims.

In the drawings:

Fig. 3 is a bottom plan view to better show the power accumulating drive.

Fig. 4 is a fragmentary view to better show the arrangement of operating levers.

Fig. 5 is a perspective view of the operating levers.

Fig. 6 is a view similar to Fig. 1 showing a modified construction of the mechanism.

Figure 1:
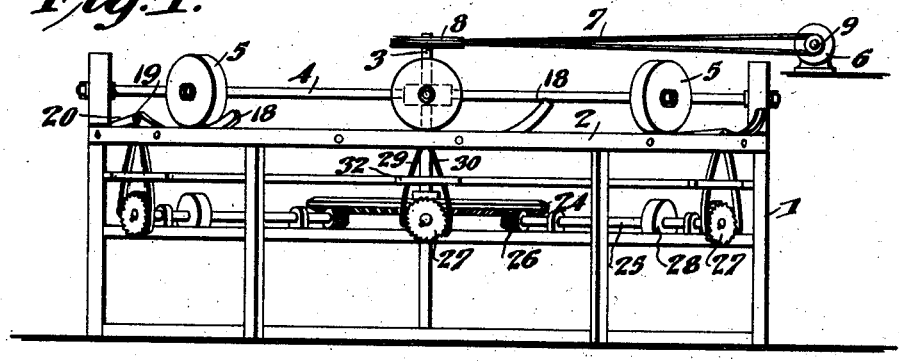
Figure 1 is a view in side elevation of a mechanism constructed in accordance with our invention.
Figure 2:
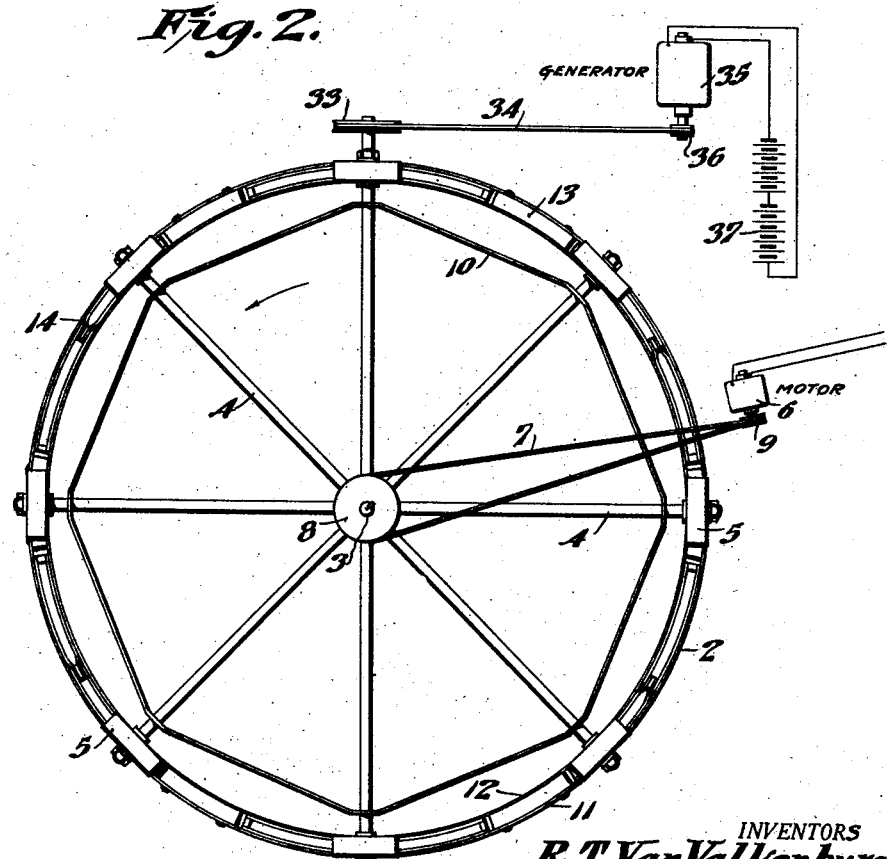
Fig. 2 is a top plan view.

In the main adaptation we have shown our mechanism adapted to transmit rotary motion at increased or decreased speed. The supporting frame structure, generally indicated at 1, has a circular track 2 carried around the upper or top edge thereof and preferably rigidly supported in a substantially level horizontal plane. A shaft 3 is journalled perpendicularly centrally within the track 2 for free rovoluble movement, and this shaft has a hub thereon from which shaft arms 4 extend radially in equidistant spacing. The hub and shaft arms are secured upon the shaft 3 to be revolved therewith. At the end of each of the shaft arms 4 a weighted wheel or roller 5 is revolubly mounted to bear and travel upon the track 2. These several wheels or rollers 5 are preferably provided with ball or roller bearings, or other means to reduce friction to a minimum, and as the shaft arms 4 do not bear any weight or load the several wheels 5 will roll easily upon the level track 2. As the shaft 3 is rotated the entire structure including the shaft arms 4 and weighted wheels or rollers 5 will be carried around with a revoluble movement, the weighted wheels or rollers causing the entire structure to travel with a sustained movement and with a minimum power requirement after the operation has been initiated. A motor 6, or other power means, can be employed to revolve the head structure carrying the weighted wheels or rollers 5, and in the present instance we have shown a twisted belt 7 extending from the motor over a belt pulley 8 fixed on shaft 3. The belt pulley 8 on the shaft 3 and the motor belt pulley 9 will be made in relative sizes to reduce or increase the ratio of rotation of shaft 3, as occasion may demand, and when the head structure revolves it will rotate substantially after the manner of a balance wheel or spinning top, the perfect balance and the equal distribution of weight serving to permit and sustain rotation with a minimum expenditure of driving energy from the motor 6 or other source of power. To hold the equidistant spacing of the several shaft arms and unite the structure more rigidly into a rotary head, it may be found desirable to provide the cross braces 10 between the shaft arms adjacent their outer extremities.

The trackway 2 is made up of two annular track rails 11 and 12 concentrically arranged in spaced relation, with spacing blocks 13 holding a predetermined spacing. As the weighted wheels or rollers 5 are carried around upon this trackway they will bear substantially equally upon the annular track members 11 and 12, and the contacting portion will bridge across the substantially annular space between the track members. Thus, lever mechanisms, one of which is shown in Fig. 5 and generally indicated at 14, mounted between the annular track members 11 and 12 will be directly in the path of the weighted wheels or rollers.

In the present instance we have shown the rotatable head as having eight equally spaced radially extending shaft arms with a weighted wheel or roller carried by each of these shaft arms, and it will be appreciated that this number might be increased or decreased and would be varied to suit different requirements of use. In any event, it is preferable that the number of lever mechanisms 14 be less or greater than the number of weighted wheels or rollers, so that the impact or interval of operation will be varied, and staggeared upon the several weighted wheels or rollers as the head is rotated. In this instance we have shown six sets of lever mechanisms and by experiment we have found that this ratio functions very efficiently; however, variations can be made one way or the other to suit different conditions of use.

A set of the lever mechanisms is shown in Fig. 5, and as here illustrated the power impulse lever 15 is mounted on a bearing pin 16 in the slot between the track members 11 and 12 with the impulse end 17 relatively short and the leverage portion 18 proportionately much longer. The leverage end or portion 18 is formed on a gradual curve so that it will extend above the trackway 2 when the power impulse transmitting end is between the track rails, and when the portion 18 is lowered or swung down to be between the rails, the end 17 will be raised or swung to project above the rails. A bearing pin 19 mounted at the free end of the portion 17 has leverage portions or links 20 mounted thereon and the free ends of these links or portions 20 are supported on a friction roll 21. The leverage portions or links 21 are relatively longer than the power transmitting lever portions 17, and the part of the leverage portions 20 adjacent the bearing pin 19 will be projected above the top edges of the track rails 11 and 12 when the portion 18 of lever 15 is swung down. As shown, these levers 15 and 20 are made up of two side members rigidly connected together by cross braces 22, but it will be appreciated that the levers and links can be made of any desired form and construction. The levers 15 and links 20 are curved so that they will swing up and down in the slot between the track members 11 and 12 freely.

As shown in Fig. 4, when the end 18 is swung down, the ends 17 of the lever 15 will be raised and the top edge of link or lever portion 20 is then presented to rise in a gradual incline over the trackway. As the weighted wheels 5 roll and travel around the trackway they will ride up on this inclined top edge of the lever or link 20 depressing the same as shown by the dotted lines, and the end 18 is then swung up to project above the trackway. As the rotation of the weighted wheel continues and this wheel moves in the direction indicated by the arrow it will ride up on the curved end 18 of lever 15 depressing this end to the position shown by full lines in Fig. 4, and the bearing pin 19 is then again raised.

The pivot or bearing pin 19 is alternately and successively raised and lowered with an oscillating or reciprocatory movement as the several rollers or weighted wheels pass successively over the leverage mechanism and around the trackway 2, and this power impulse can be used to accomplish reciprocatory movement of a working part or can be transmitted into revoluble or rotating movement. In the main embodiment we have shown the parts arranged to deliver power from a rotating shaft. In the supporting frame structure below the shaft 3 we provide a shaft 23 which has a relatively large miter gear 24 thereon, there being no connection between the shafts 3 and 23 so that they can be rotated independently. A plurality of power transmission shafts 25 are journalled radially in the supporting frame structure 1 and are provided with miter gears 26 on their inner ends in mesh with the teeth of miter gear 24, the outer ends of the several power transmission shafts 25 being located substantially vertically beneath the position of pivot or bearing pins 19. A ratchet wheel 27 is fixed on the outer end of each shaft 25 and a weighted balance or drive wheel 28 is carried by each shaft. The pivot or bearing pin 19 has a push-pawl 29 mounted loosely thereon to extend adjacent the toothed periphery of ratchet wheel 27 on one side and a hooked drag pawl 30 also pivoted on pin 19 is disposed with its hooked end adjacent the toothed periphery of the wheel 27 on the opposite side, a spring 31 being provided to resiliently hold the dog ends of the members 29 and 30 against the wheel. Guides 32 are provided to hold the pawl members 29 and 30 in proper working alinement with respect to the ratchet wheels 27. One of the shafts 25 has a belt wheel 33 carried at its extreme outer end and a belt 34 can be placed upon this to run a generator 35, or other mechanism to be operated.

Where a generator is to be operated the belt pulley 36 on the shaft thereof will be relatively smaller than the belt pulley 33 to increase the speed of rotation to the most efficient operating speed for the generator. A connection can be made from the generator to storage batteries 37 or the power thus generated can be stored or used in any other desired and approved manner. With the several shafts 25 driving to the single miter gear 24 and the location of the sets of lever mechanism staggered with respect to the relative spacing of the weighted wheels 5, the parts are so arranged that a substantially continuous successive power exerting operation will be accomplished upon the miter gear 24 through one of the shafts 25, and the balance or drive wheels 28 will aid in maintaining a uniform speed of rotation and accomplishing a greater driving force. The rotative power taken off at belt wheel 33 will be substantially constant.

As the parts are illustrated in Fig. 6 we have shown one arrangement for making use of the reciprocatory movement without transmitting or transferring this into rotary motion, and in this instance we have shown the supporting frame 38 mounted with its lower end submerged in water, as in, for instance, a lake, pond or stream, the operating parts being carried at an elevation above water. A pump 39 is carried by the frame 38 beneath each of the pivot or bearing pins 19 and the plunger rod 40 of the pump is connected by a link 41 with the bearing or pivot pin 19 so that as the lever mechanisms are actuated the pump plungers 40 will be raised and lowered to pump water. Pipes 42 and 43 are shown as connected with the pumps 39 to conduct the water to any desired point of discharge, and it will be appreciated that this pipe can be arranged in any desired manner.

As the parts are illustrated in Fig. 6, we have shown an internal combustion engine 44 as the power means rotating the shaft 3 by which the revolving head carrying weighted wheels or rollers 5 is rotated but any other suitable form of power means might be employed.

From the foregoing it will be seen that we have provided a mechanism which will operate positively and efficiently to transmit power, and while we have shown and described only certain specific embodiments of our invention and have suggested only certain possible changes and modifications in the construction, arrangement and mounting of the parts, and in the use of the mechanism, it will be appreciated that other changes and variations can be resorted to without departing from the spirit and scope of our invention.

We claim:

1. A power transmission mechanism comprising a slotted track, a power impulse lever mounted for swinging movement within the slotted portion of the track, leverage links associated with said impulse lever and arranged to extend from said slotted portion of the track when the impulse lever is in certain positions, and weighted wheels traveling on the track to roll into contact with and swing the leverage links and consequently move the power impulse lever.

2. A power transmission mechanism comprising a substantially circular slotted track, a plurality of power impulse levers mounted at spaced points around said track for swinging movement within the slotted portion of the track, leverage links associated with said impulse levers, a rotatable head, and a plurality of weighted rolls associated with said head to be moved thereby to travel around the track to roll upon and swing the leverage links and consequently move the power impulse levers.

3. A power transmission mechanism comprising a substantially circular slotted track, a plurality of power impulse levers mounted at spaced points around said track for swinging movement within the slotted portion of the track, leverage links associated with said impulse levers, a rotatable head, a plurality of weighted rolls associated with said head to be moved thereby to travel around the track to roll upon and swing the leverage links and consequently move the power impulse levers, and a power transmission connection from said impulse levers.

4. A power transmission mechanism comprising a slotted track, a power impulse lever given swinging mounting within the slotted portion of the track at a point back from one end and having the remaining end relatively longer and curved to extend from said slotted portion of the track, a leverage link pivotally connected with the free end of the power impulse lever and having a movable connection at a substantially fixed point within the slotted portion of the track, and weighted wheels traveling on the track to engage with said link and the curved end of said impulse lever to swing said power impulse lever upwardly and downwardly.

5. A power transmission mechanism comprising a slotted track, a power impulse lever mounted for swinging movement within the slotted portion of the track, leverage links associated with said impulse lever to extend from said slotted portion of the track when the impulse lever is in certain positions, weighted wheels traveling on the track to roll into contact with and swing the leverage links and consequently move the power impulse lever, a power delivery shaft, a ratchet wheel on said shaft, and a dog carried by the impulse lever working against said ratchet wheel to impart revoluble movement to said shaft.

6. A power transmission mechanism comprising a slotted track, a power impulse lever given swinging mounting within the slotted portion of the track at a point back from one end and having the remaining end relatively longer and curved to extend from said slotted portion of the track, a leverage link pivotally connected with the free end of the power impulse lever and having a movable connection at a substantially fixed point within the slotted portion of the track, weighted wheels traveling on the track to engage with said link and the curved end of said impulse lever to swing said power impulse lever upwardly and downwardly, a power delivery shaft, a ratchet wheel on said shaft, and a dog carried by the impulse lever working against said ratchet wheel to impart revoluble movement to said shaft.

In testimony whereof we hereunto affix our signatures.

RANDALL T. VAN VALKENBURGH.
CECIL J. VAN VALKENBURGH.